United States Patent [19]

McDonald et al.

[11] Patent Number: 5,256,432
[45] Date of Patent: Oct. 26, 1993

[54] METHOD OF MAKING PIZZA WITH A PIZZA TOPPINGS DISK

[75] Inventors: Jane M. McDonald, Louisville, Ky.;
Lynn R. Bingham, Sapulpa, Okla.;
Lori B. Higgins, Coralville, Iowa;
Kathryn M. Jennings, Madrid, Spain;
Susan Koeppe, Omaha, Nebr.;
Edward O'Neill, Fort Wayne, Ind.

[73] Assignee: Pizza Hut, Inc., Wichita, Kans.

[21] Appl. No.: 954,799

[22] Filed: Sep. 30, 1992

Related U.S. Application Data

[63] Continuation of Ser. No. 798,070, Nov. 20, 1991, abandoned, which is a continuation of Ser. No. 613,249, Nov. 13, 1990, abandoned.

[51] Int. Cl.⁵ ............................................. A23P 1/08
[52] U.S. Cl. ........................................ 426/275; 426/92; 426/94; 426/95; 426/290; 426/296
[58] Field of Search .................... 426/89, 92, 94, 274, 426/290, 296, 303, 307, 582, 275, 95

[56] References Cited

U.S. PATENT DOCUMENTS

| 3,221,672 | 12/1965 | Falco . | |
|---|---|---|---|
| 3,358,618 | 12/1967 | Vetta . | |
| 3,648,596 | 3/1972 | Zito | 99/450.7 |
| 3,725,974 | 4/1973 | Kuhlman . | |
| 3,735,692 | 5/1973 | Marchignoni | 99/353 |
| 3,760,715 | 9/1973 | Grote et al. | 99/450.7 |
| 3,892,171 | 7/1975 | Fitch et al. | 99/450.7 |
| 4,066,796 | 1/1978 | Mckee | 426/303 |
| 4,112,834 | 9/1978 | Thiry | 99/450.1 |
| 4,152,976 | 5/1979 | Kawasaki et al. | 99/450.1 |
| 4,159,349 | 6/1979 | Caiello | 426/296 |
| 4,197,794 | 4/1980 | Raque et al. | 99/450.1 |
| 4,276,465 | 6/1981 | Flavio | 219/388 |
| 4,283,431 | 8/1981 | Giordano et al. | 426/296 |
| 4,367,243 | 1/1983 | Brummett et al. | 426/307 |
| 4,753,815 | 6/1988 | Kielsmeier | 426/582 |
| 4,997,670 | 3/1991 | Kielsmeier et al. | 426/296 |
| 5,023,096 | 6/1991 | Plochman | 426/89 |
| 5,117,749 | 6/1992 | Bakker | 99/450.1 |
| 5,121,677 | 6/1992 | LeClaire et al. | 99/357 |

FOREIGN PATENT DOCUMENTS

| 0765996 | 9/1971 | Belgium . | |
|---|---|---|---|
| 0168118 | 1/1986 | European Pat. Off. | 426/296 |
| 2639193 | 5/1990 | France | 426/296 |
| 0012963 | 1/1982 | Japan | 426/582 |
| 21067 | 1/1986 | Japan | 426/582 |
| 0005383 | 2/1986 | Japan | 426/582 |
| 232333 | 10/1987 | Japan | 426/307 |
| 267242 | 11/1988 | Japan | 426/582 |
| 108959 | 4/1989 | Japan | 426/582 |
| 2000010 | 1/1979 | United Kingdom | 426/582 |
| 2223391 | 4/1990 | United Kingdom . | |

Primary Examiner—Arthur L. Corbin
Attorney, Agent, or Firm—Willian Brinks Olds Hofer Gilson & Lione

[57] ABSTRACT

A pizza toppings disk as well as a method of making a pizza toppings disk and a method of making a pizza using a toppings disk are disclosed. In accordance with the present invention a pizza toppings disk is made by combining a quantity of cheese with a plurality of pizza toppings that may include but are not limited to the following items: sliced meats, ground meats, and vegetables, as well as combinations thereof. The quantity of cheese and selected pizza toppings are combined into a layer that is appropriately shaped to be placed on a pizza shell. The cheese and the selected pizza toppings are fused together to form a pizza toppings disk that may be stored for subsequent use in assembling a pizza. In making a pizza in accordance with the present invention a pizza toppings disk is placed on a uncooked pizza shell and the pizza toppings disk and uncooked pizza shell are then baked to produce a cooked pizza.

24 Claims, 4 Drawing Sheets

METHOD OF MAKING PIZZA WITH A PIZZA TOPPINGS DISK This application is a continuation of application Ser. No. 07/798,070, filed Nov. 20, 1991, which is a continuation of application Ser. No. 07/613,249, filed on Nov. 13, 1990, both now abandoned.

BACKGROUND OF THE INVENTION

The present invention relates to the field of pizzas and pizza toppings. More particularly, the invention relates to methods of assembling pizza ingredients to form pizzas.

The preparation and cooking of pizzas in the food industry requires numerous labor intensive steps. For example, pizza dough is prepared and formed into a shell. Also, the cheese and pizza toppings are applied to the shell one at a time. In addition, in a pizza restaurant delivery and/or carryout business each ingredient that is added as a topping is typically measured or weighed to insure uniformity of the finished product. Naturally, these several steps add to the cost and the time it takes to prepare the products.

Assuring uniformity of pizzas made by different employees can also be a challenge for the pizza restaurant, delivery, and/or carryout business.

Products and methods have been developed attempting to reduce the cost and increase the speed and uniformity of preparing pizzas.

For instance, U.S. Pat. No. 4,159,349 to Caiello discloses a pizza and method for making the same that includes using up to four geometrically congruent slices of pizza cheese having apertures. The slices are arranged to form one layer to cover the pizza shell.

U.S. Pat. No. 4,066,769 to McKee discloses a pizza coating product containing a water-soluble algin, preferably for use with a frozen pizza. The water-soluble algin is applied to the surface of the pizza dough that forms the pizza crust prior to the addition of any toppings or tomato sauce.

U.S. Pat. No. 4,753,815 to Kielsmeier, et al., discloses a method of preparing and quick freezing cheese in granular form to maintain granule moisture. The cheese granules are then baked on the pizza in a frozen or partially frozen condition.

U.S. Pat. No. 4,283,431 to Giordano, et al., discloses a method of making a double-layered pizza product. The method disclosed uses two layers of pastry dough with traditional pizza toppings placed in between the pastry layers before baking the pizza.

SUMMARY OF THE INVENTION

Briefly stated, the present invention is a pizza toppings disk, as well as a method of making a pizza toppings disk, and a method of making a pizza using a pizza toppings disk.

In accordance with the present invention a pizza is made by combining a quantity of cheese with a plurality of pizza toppings that may include but are not limited to the following items: sliced meats, ground meats, or vegetables, as well as combinations thereof. The quantity of cheese and selected pizza toppings are combined into a layer that is appropriately shaped to be placed on a pizza shell. The cheese and the selected pizza toppings are fused together to form a pizza toppings disk that is stored for subsequent use in assembling a pizza. A pizza shell is provided and an uncooked pizza is formed by assembling the pizza toppings disk and the pizza shell. The toppings disk and the shell are then baked to provide a pizza.

In a preferred embodiment of the present invention a quantity of cheese is distributed over a forming surface to form a layer of cheese. Applied on top of this layer of cheese are selected amounts of typically requested pizza toppings. The layer of cheese and the selected pizza toppings are then fused together to form a pizza toppings disk that is stored for subsequent use in assembling a pizza.

In a more preferred embodiment of the present invention, a second quantity of cheese is distributed on top of a first layer of cheese and selected pizza toppings to form a second layer of cheese. The layers of cheese and the pizza toppings are then fused together to form a pizza toppings disk. The toppings disk may then be stored for subsequent use.

In a most preferred embodiment of the present invention a third quantity of cheese is mixed with the selected plurality of pizza toppings prior to applying these toppings to a first layer of cheese.

In making a pizza in accordance with the present invention a pizza shell is provided. An uncooked pizza is formed by assembling the toppings disk and the pizza shell. The toppings disk and pizza shell are then baked to provide a pizza.

The present invention offers several advantages for a pizza restaurant, delivery and/or carryout business. Some advantages include convenience, better uniformity of pizzas made by different employees, and closer control over the final product because a pizza toppings disk can be made prior to when a pizza is ordered. Pizza toppings disks can be made during off peak hours and stored for subsequent use. By making a pizza toppings disk in advance, each ingredient may be weighed and measured more carefully during these off peak hours then is permitted during hours when demand for pizzas is high.

Additionally, the present invention can reduce the amount of time required to prepare a pizza. When an order for a pizza is received the pizza can be assembled more quickly by using a pizza toppings disk that has been prepared in advance, than by using the present traditional methods of making a pizza.

Optionally, another advantage offered by the present invention is that pizza restaurants, deliveries and/or carry out businesses may prepare or receive pizza toppings disks that have been prepared at a centralized location. Preparing the topping disks at a centralized location can reduce the preparation space necessary to make an assembled pizza on site at these businesses.

The present invention, together with its attendant objects and advantages, will be best understood with reference to the detailed description below read in conjunction with the accompanying drawings.

DETAILED DESCRIPTION OF THE PREFERRED EMBODIMENTS

Figure 1:
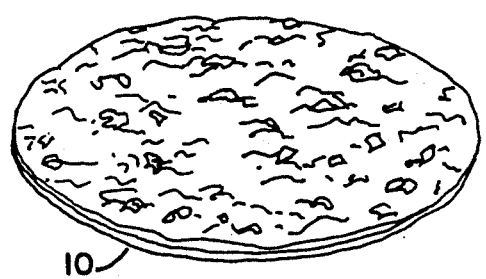
FIG. 1 is a perspective view of a pizza toppings disk made in accordance with the present invention.

In accordance with the present invention, the pizza toppings disk 10 of FIG. 1 is made by combining one or more quantities of cheese with a plurality of pizza toppings that may include one or more of the following selected items: sliced meats, ground meats, or vegetables, as well as combinations thereof.

In general, any type of cheese appropriate for a pizza is used to make a pizza toppings disk of the present invention. Preferably cheeses which melt evenly and do not separate upon heating are used to form a toppings disk. More preferably low moisture part-skim mozzarella cheese is used.

The cheeses used to make a pizza toppings disk of the present invention are preferably in the form of shredded or sliced cheeses. Shredded cheeses used may be of a powder consistency. Spices may be added to the cheeses used to form a pizza toppings disk. Such spices may include but are not limited to the following: oregano, italian seasoning, garlic, basil, salt or pepper, as well as combinations thereof.

The amounts of the total specified quantity of cheeses to be used and the amounts of the selected pizza toppings to be applied vary according to the size and type of pizza toppings disk desired. Typically, the total quantity of cheese used amounts to between approximately 30% and 90% of the total weight of a pizza toppings disk.

The cheese is combined with selected amounts of typically requested pizza toppings and is distributed as a layer on a forming surface. This layer is appropriately shaped to be placed on top of a pizza shell. The layer may be shaped by dispensing the quantity of cheese combined with the selected pizza toppings over a forming surface having the desired diameter of a finished toppings disk. Generally, the forming surface can be any flat surface, such as the surface of a flat conveyor belt or make table. Typically, the forming surface used may be one of the following surfaces: pans, paper, ring, mold, or similar items. Preferably the forming surface is made of parchment paper.

The pizza toppings of the present invention may include but are not limited to selections from the following group of items: sliced meats, ground meats, or vegetables, as well as combinations thereof. Optionally the selected toppings may be pre-cooked prior to forming a toppings disk. Preferably, the amounts of a selected pizza topping are premeasured for the desired disk size and evenly distributed over the surface area of the pizza toppings disk. Amounts of the pizza toppings combined with the total specified quantity of cheese may vary according to the size and type of pizza toppings disk desired. Optionally, the pizza toppings disk may be customized to certain topping types by combining an individual pizza topping or a combination of pizza toppings with the total specified quantity of cheese. Additionally, a combination of one or more toppings disks may be utilized for assembling a single pizza.

The present invention includes several embodiments for providing a pizza toppings disk. Generally, these embodiments include distributing one or more quantities of cheese over a forming surface and forming these quantities of cheese into one or more layers of cheese. The selected pizza toppings are also distributed as a layer. The components are then fused together to form a pizza toppings disk that is stored for subsequent use in assembling a pizza.

In a preferred embodiment of the present invention a quantity of cheese is distributed over the forming surface to form a layer of cheese. Applied on top of this layer of cheese are selected amounts of typically requested pizza toppings.

In a more preferred embodiment of the present invention, a first quantity of cheese is formed into a first layer of cheese on a forming surface. In accordance with this preferred embodiment between approximately 20% and approximately 80% of the total specified quantity of cheese of the toppings disk is distributed on the forming surface to form the first layer of cheese. Applied on top of this layer of cheese are the selected amounts of typically requested pizza toppings. A second quantity of cheese is evenly dispensed over the first layer of cheese and the selected pizza toppings to form a second layer of cheese. Typically this second layer of cheese consists of between approximately 20% and approximately 80% of the total specified quantity of cheese for the toppings disk.

Figure 2:
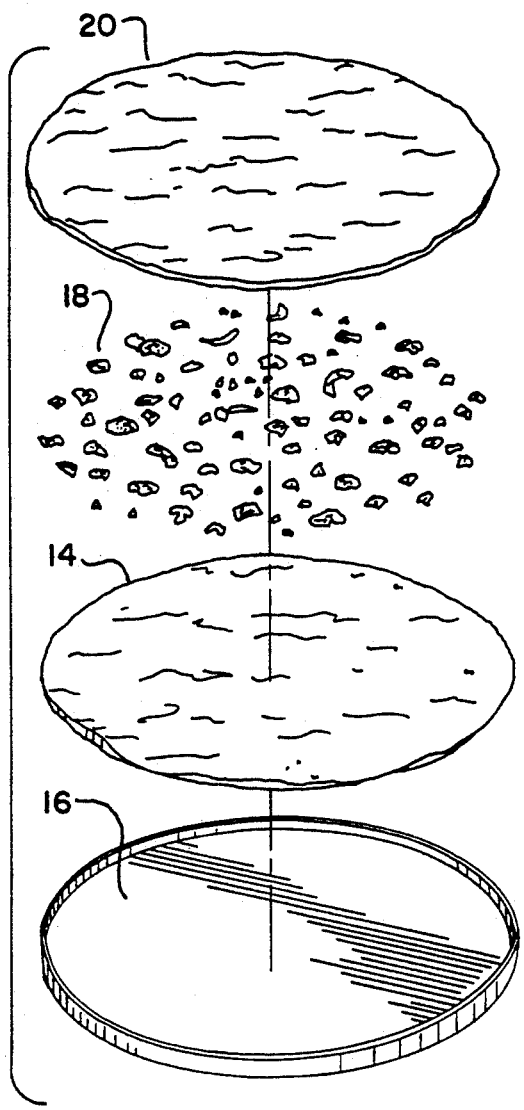
FIG. 2 is a perspective view illustrating a preferred method of forming a pizza toppings disk of the present invention.

In the most preferred embodiment of the present invention, as shown in FIG. 2, a first quantity of cheese is formed into a first layer of cheese 14 on a forming surface 16. Typically between approximately 35% and approximately 45% of the total specified quantity of cheese in this most preferred embodiment is distributed on the forming surface 16 to form the first layer of cheese 14. Prior to the application of selected amounts of typically requested pizza toppings a portion of the total specified quantity of cheese is combined with these selected pizza toppings. This combination of cheese and selected pizza toppings is depicted in FIG. 2 as reference numeral 18. The combination 18 of cheese and selected pizza toppings is deposited onto the first layer of cheese 14. In this most preferred embodiment, between approximately 10% and approximately 20% of the total specified quantity of cheese is included in the combination 18 of cheese and pizza toppings. In accordance with this most preferred embodiment, a second quantity of cheese is evenly dispensed over the first layer 14 of cheese and the combination 18 of cheese and selected toppings. The second quantity of cheese is dispensed to form a second layer of cheese 20. In this most preferred embodiment, the second layer of cheese 20 consists of between approximately 35% and approximately 45% of the total specified quantity of cheese for a pizza toppings disk.

In accordance with the present invention, the total specified quantity of cheese and the selected pizza toppings are fused together to form a pizza toppings disk that may be stored for subsequent use. The total quantity of cheese and selected pizza toppings may be fused together by one of the following methods: chemical, mechanical, or thermal methods. Examples of such methods include but are not limited to partially melting the cheese; applying a vacuum; applying a pressure such as a roller press; applying a food safe adhesive such as gums, pectines, gelatins, or an edible film; or applying a food safe shrink wrap or a spray wrap.

Preferably the total quantity of cheese and the selected pizza toppings are fused together by heating. In accordance with such a method, the components are subjected to a partial, minimal melt. The temperature necessary to accomplish this minimal melt may vary depending on the type of cheese used and the type of heating element employed. When the preferred cheese, low moisture part-skim mozzarella is used, the temperature at which a partial, minimal melt is achieved is approximately 425° F. The amount of time required to achieve a partial minimal melt varies according to the following factors: the selected heating temperature, the individual pizza toppings chosen, and the final size desired for the toppings disk.

Under the preferred fusing method, a pizza toppings disk of the present invention may be increased in size by applying unmelted cheese, in a concentric circle, to the existing fused toppings disk and repeating partial, minimal melts as necessary.

After fusing, a pizza toppings disk of the present invention may be stored for subsequent use in assembling a pizza. Preferably, the pizza toppings disk is stored under refrigeration without being frozen prior to being used in assembling a pizza. Optionally, the pizza toppings disk may be frozen for a more prolonged storage prior to being used in assembling a pizza.

Figure 3:
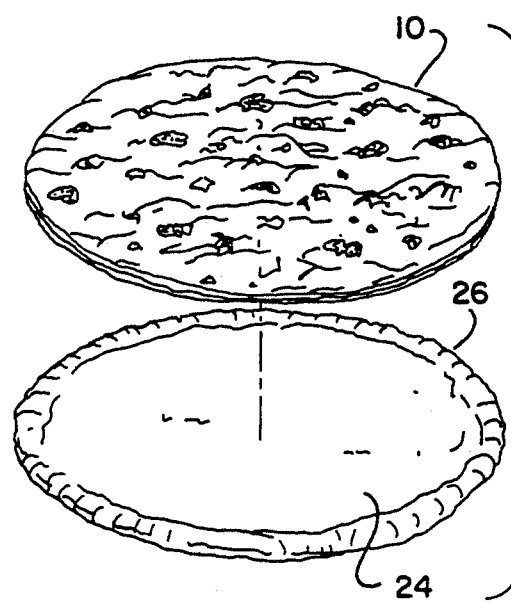
FIG. 3 is a perspective view illustrating a preferred use for a pizza toppings disk of the present invention.

Referring now to FIG. 3, a pizza toppings disk 10 is most preferably used in assembling a pizza. Optionally, a pizza toppings disk of the present invention may be placed onto the uncooked shell of any size or type of pizza. Examples of such shells may include but are not limited to pizza shells for a hand-tossed traditional crust, a pan-style pizza, a thin-crust style pizza, or a double-crust style pizza. These styles of pizzas are well known in the art. In accordance with the present invention an uncooked shell is intended to include "par baked" shells which are shells that are partially baked, completely unbaked shells, or any shell that is frozen. Optionally, a fully baked shell or fully baked shell frozen in advance, may be used in assembling a pizza.

Figure 4:
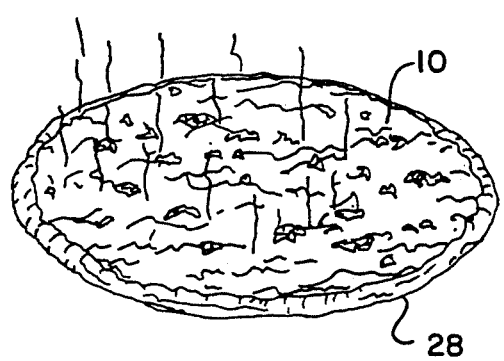
FIG. 4 is a perspective view of a cooked pizza made in accordance with the present invention.
Figure 5:
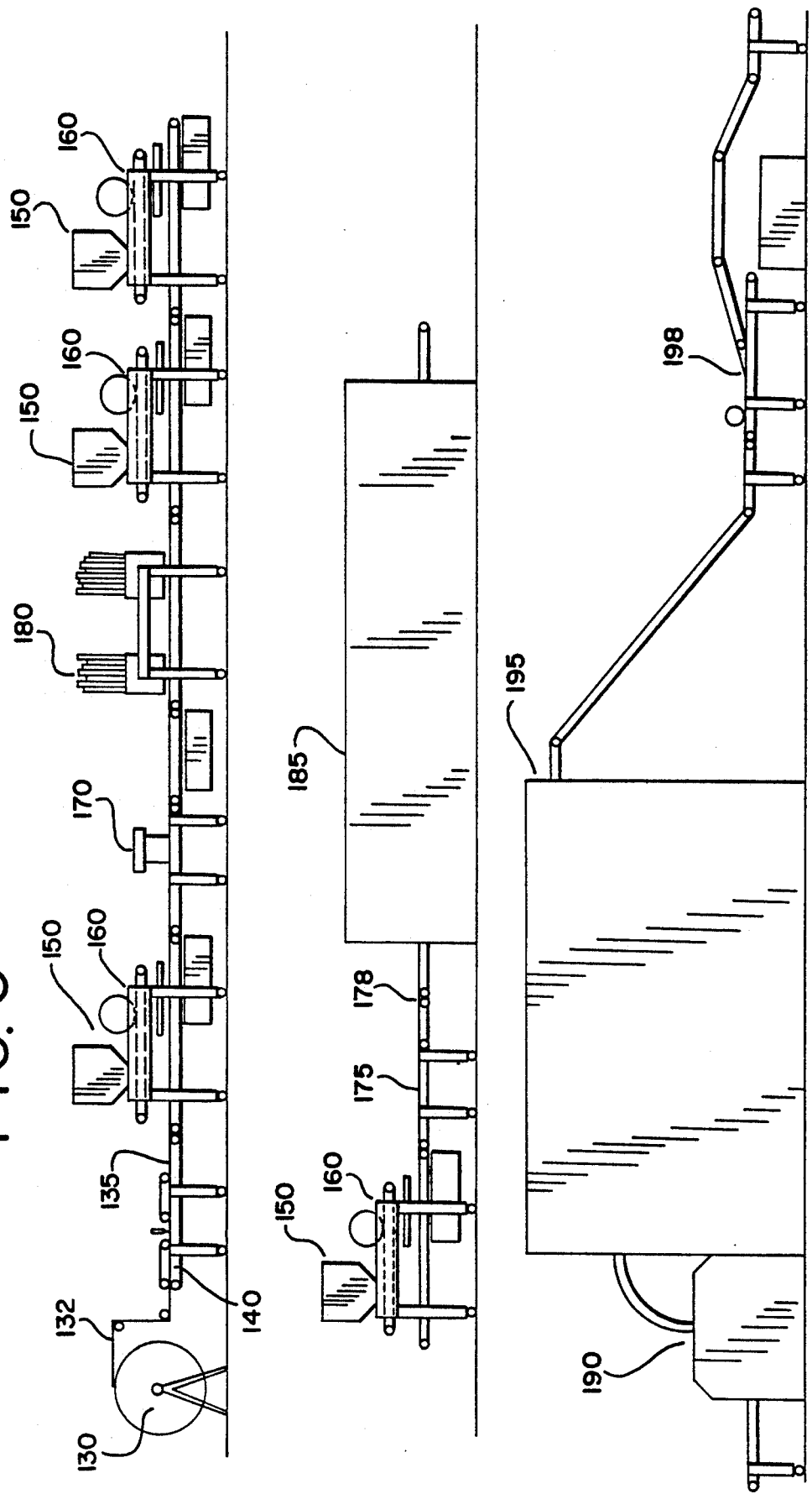
Figure 6:
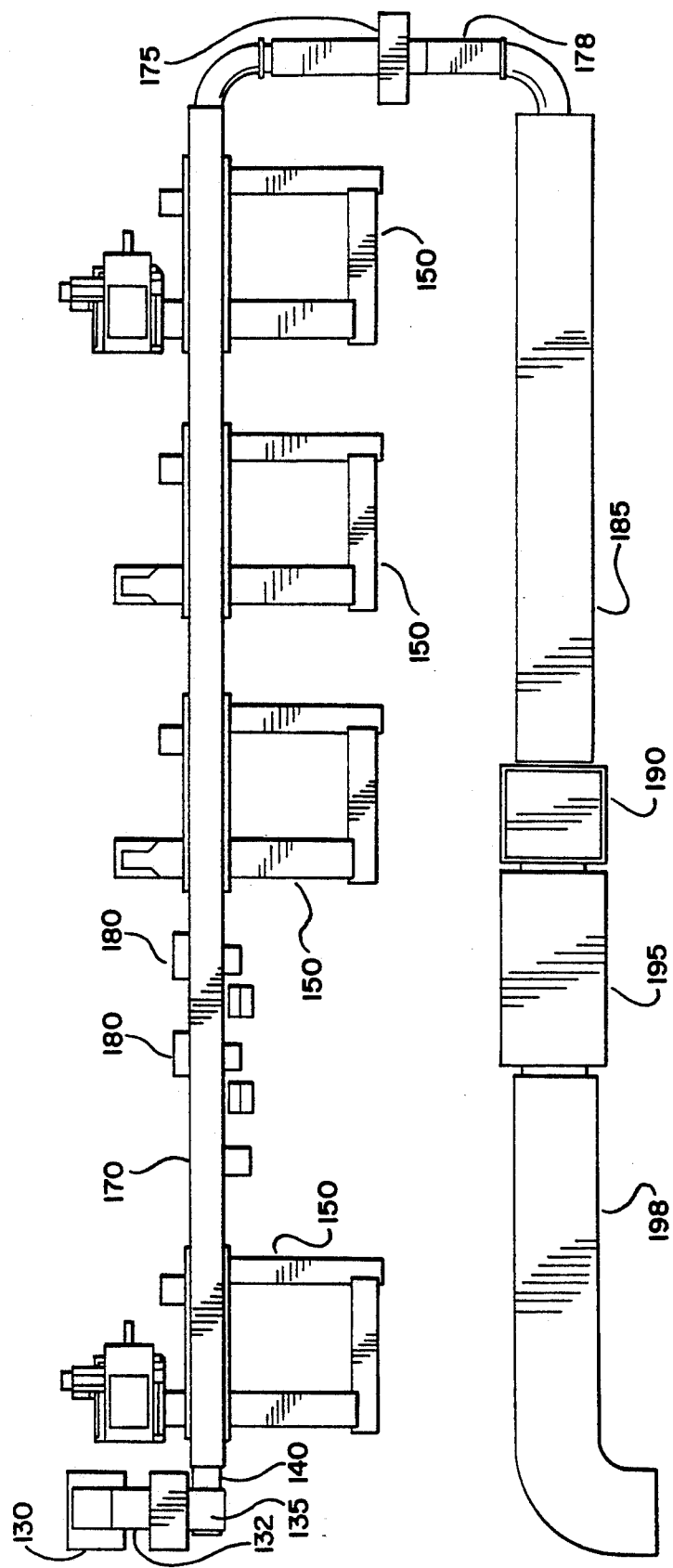
Figure 7:
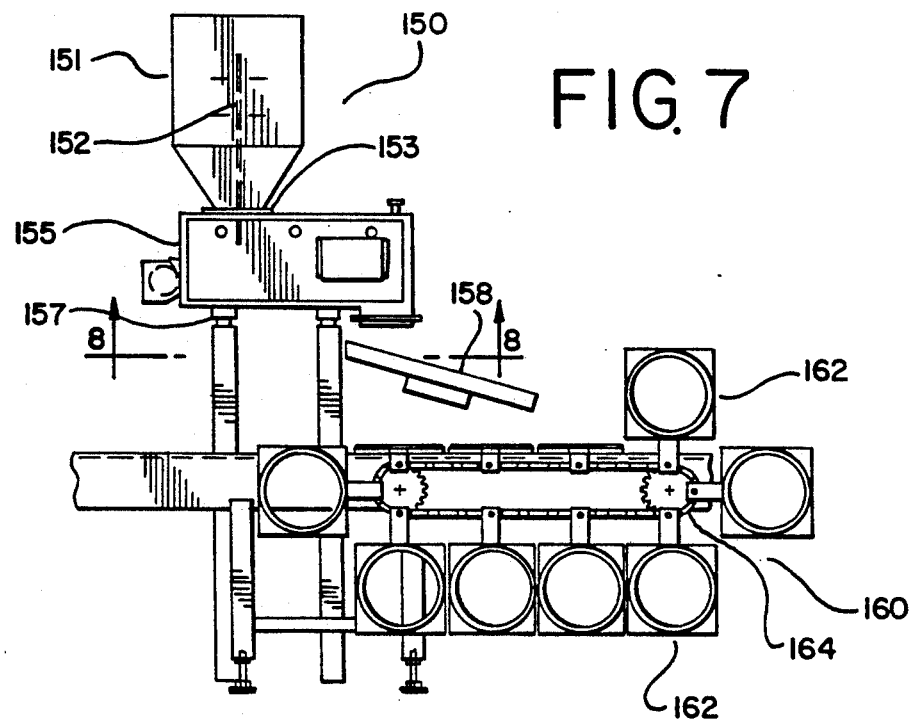
Figure 8:
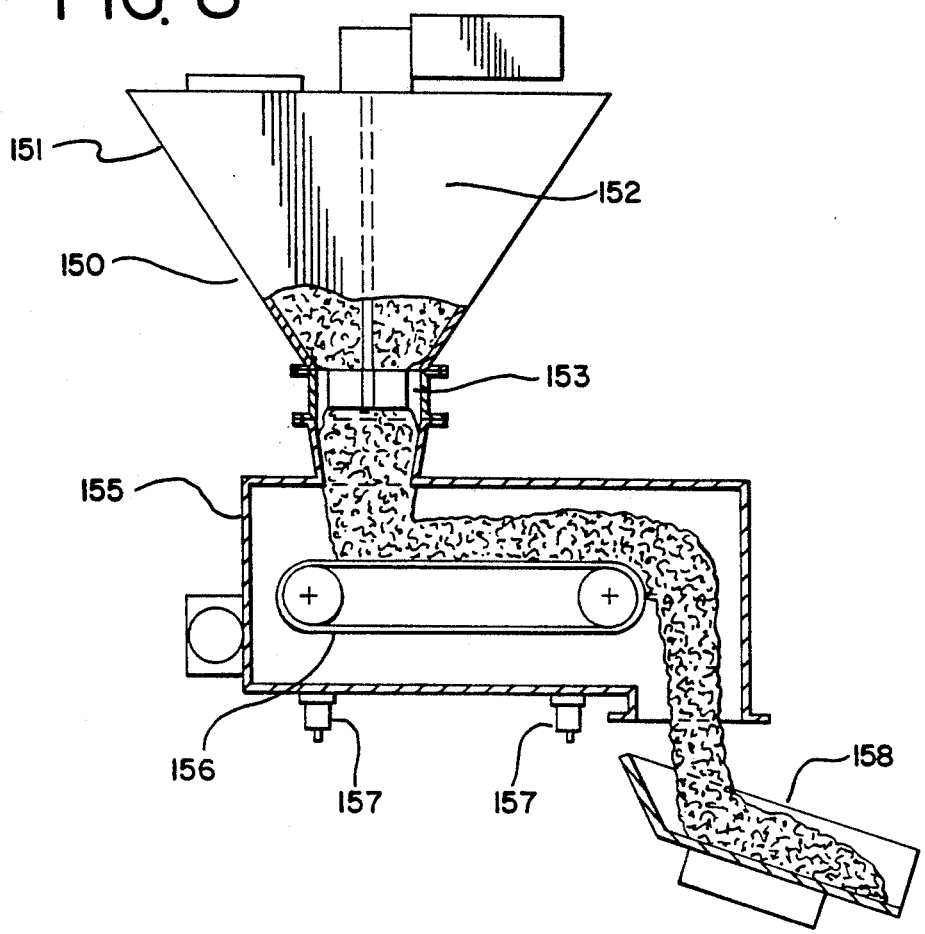

As illustrated in FIG. 3, The toppings disk 10 is removed from storage and is placed on top of an uncooked pizza shell 26. The pizza toppings disk and uncooked pizza shell are then baked to produce a cooked pizza 28, as illustrated in FIG. 4. Baking may include the use of a microwave to produce the cooked pizza 28. Preferably tomato sauce or traditional pizza sauce is applied between the toppings disk and the pizza shell.

The process of making the present invention may be automated. Automating the process can reduce labor and overhead expenses. The process may be automated by use of a conveyor means. Typically the conveyor is loaded with forming surfaces and the cheese and selected pizza toppings are dispensed automatically onto the forming surfaces. The components are then fused to form a toppings disk of the present invention. The toppings disk is then stored for subsequent use in assembling a pizza.

Optionally, under the present invention, pizza toppings disks may be prepared at a central location and then shipped to individual pizza restaurants, deliveries, and/or carryout businesses. Making the toppings disks of the present invention at a centralized location can reduce overhead expenses.

EXAMPLES

The following examples and tables, set forth below for purposes of illustration and description, further describe and illustrate a variety of pizza toppings disks made in accordance with the present invention. These examples and tables are not intended to be exhaustive or to limit the invention to the precise forms disclosed.

TABLE I illustrates by way of example the amounts of cheese and selected pizza toppings necessary for a variety of pizza toppings disks.

TABLE 1

| PIZZA TOPPINGS DISK TYPE | TOTAL QUANTITY OF CHEESES (ounces) | SELECTED TOPPINGS AND QUANTITIES (ounces) |
|---|---|---|
| SUPREME | 7-8 oz. low moisture part-skim mozzarella | Sliced meats 1-2 oz. Ground meats 2-4 oz. Vegetables 1-3 oz. |
| PEPPERONI | 3.5-4.5 oz. low moisture part-skim mozzarella | Sliced meats 2-3 oz. |
| VEGETABLE | 3.5-4.5 oz. low moisture part-skim mozzarella | Vegetables 7-9 oz. |

A SUPREME pizza is a pizza consisting of a plurality of pizza toppings. The typical pizza toppings placed on a SUPREME pizza include sliced meats such as pepperoni, ground meats such as sausage, and a variety of vegetables. In assembling a pizza toppings disk for a SUPREME pizza in accordance with the most preferred embodiment of the present invention, between 35% and 45% of the total quantity of cheese specified is evenly distributed on a forming surface having the desired diameter of the finished disk. This first quantity of cheese is formed into a first layer of cheese. Sliced meats are placed over this layer. Between 10% and 20% of the total quantity of cheese used is mixed with vegetables and ground meats and deposited onto the first layer of cheese. A second quantity of cheese consisting of between 35% and 45% of the total quantity of cheese used in a SUPREME pizza is then deposited onto the previous layer of cheese and layer of selected pizza toppings to form a second layer of cheese. The components are then fused to form a pizza toppings disk.

The other examples of various pizzas set forth in TABLE I are made in the same manner as described above. However the total quantities of cheese used and the pizza toppings selected and quantities thereof vary according to the amounts disclosed in TABLE I.

TABLE II sets forth the corresponding preferred partial, minimal melt conditions of the preferred methods of fusing for the various toppings disks disclosed in TABLE I.

TABLE II

| PIZZA TOPPINGS DISK TYPE | TEMPERATURE PARTIAL FOR MELT (F.) | TIME FOR PARTIAL MELT (minutes) |
|---|---|---|
| SUPREME | 425° F. | 3.20 min. |
| PEPPERONI | 425° F. | 2.50 min. |
| VEGETABLE | 425° F. | 2.50 min. |

The toppings disks described above were used to assemble uncooked pizzas as follows: the pizza toppings disks were placed on top of uncooked pizza shells, and pizza sauce was applied between the toppings disks and the pizza shells. The pizza toppings disks and uncooked pizza shells were then baked to produce cooked pizzas. The appearance and texture of the cooked pizzas were the same as that of pizzas prepared by traditional methods.

The foregoing description of the preferred embodiments of the present invention has been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and various embodiments and with various modifications as are suited to the particular use contemplated. It is intended that the scope of the invention be defined by the following claims, including all equivalents.

We claim:

1. A method of making a pizza comprising the following steps:
   combining a quantity of cheese with a plurality of pizza toppings selected from the group consisting of sliced meats, ground meats, and vegetables, as well as combinations thereof, into a layer on a surface, said layer being appropriately shaped to be placed on a pizza shell;
   fusing and quantity of cheese and pizza toppings to thereby form a toppings disk;
   storing said toppings disk for subsequent use;
   providing a pizza shell;
   assembling said pizza toppings disk and said pizza shell to form an uncooked pizza; and
   baking said uncooked pizza.

2. The method of claim 1 wherein said quantity of cheese comprises shredded cheese.

3. The method of claim 1 wherein said quantity of cheese comprises sliced cheese.

4. The method of claim 1 wherein said quantity of cheese and said plurality of pizza toppings are fused together by softening said quantity of cheese and resolidifying said quantity of cheese.

5. The method of claim 1 wherein said quantity of cheese and said pizza toppings are fused together by a food safe adhesive.

6. The method of claim 1 wherein the said toppings disk is refrigerated without being frozen during storage.

7. The method of claim 1 wherein said toppings disk is frozen during storage.

8. The method of claim 1 wherein pizza sauce is applied between the toppings disk and the shell.

9. The method of claim 1 wherein the quantity of cheese and the pizza toppings are fused together by thermally softening and resolidifying the quantity of cheese.

10. The method of claim 1 wherein the toppings disk does not include pizza sauce.

11. A method of making a pizza comprising the following steps: 'forming a first quantity of cheese into a layer of cheese on a surface, said layer being appropriately shaped to be placed on top of a pizza shell;
    applying to said first layer of cheese a plurality of pizza toppings selected form the group consisting of sliced meats, ground meats, and vegetables, as well as combinations thereof;
    applying a second quantity of cheese on top of said first quantity of cheese and said pizza toppings;
    fusing said quantities of cheese and pizza toppings to thereby form a toppings disk;
    storing said toppings disk for subsequent use;
    providing a pizza shell;
    assembling said pizza toppings disk and said pizza shell to form an uncooked pizza; and
    baking said uncooked pizza.

12. The method of claim 11 further comprising the steps of:
    - combining a third quantity of cheese with said plurality of pizza toppings prior to applying said plurality of pizza toppings to said first layer of cheese.

13. The method of claim 11 wherein said quantities of cheese comprise shredded cheese.

14. The method of claim 11 wherein said quantities of cheese comprise sliced cheese.

15. The method of claim 11 wherein said quantities of cheese and said pizza toppings are fused together by softening said quantities of cheese and resolidifying said quantities of cheese.

16. The method of claim 11 wherein said quantities of cheese and said pizza toppings are fused together by a food safe adhesive.

17. The method of claim 11 wherein the said toppings disk is refrigerated without being frozen during storage.

18. The method of claim 11 wherein said toppings disk is frozen during storage.

19. The method of claim 11 wherein pizza sauce is applied between the toppings disk and the shell.

20. A method of making pizzas for a plurality of pizza outlets comprising the following steps:
    at a central location, combining quantities of cheese with pluralities of pizza toppings selected from the group consisting of sliced meats, ground meats, and vegetables, as well as combinations thereof, into layers on a surface, said layers being appropriately shaped to be placed on pizza shells; fusing said quantities of cheese and pizza toppings to thereby form toppings disks; refrigerating said toppings disks;
    shipping said toppings disks to said plurality of pizza outlets;
    at each of said pizza outlets, providing pizza shells; assembling said pizza toppings disks and said pizza shells to form uncooked pizzas; and baking said uncooked pizzas.

21. The method of claim 20 wherein the quantities of cheese and pizza toppings are fused by thermally softening and resolidifying the cheese.

22. The method of claim 20 wherein the pizza toppings disks are frozen before being shipped.

23. The method of claim 20 wherein the pizza toppings disks do not include pizza sauce.

24. The method of claim 20 wherein a layer of pizza sauce is applied between the pizza shells and the pizza toppings disks.

* * * * *

UNITED STATES PATENT AND TRADEMARK OFFICE
CERTIFICATE OF CORRECTION

PATENT NO. : 5,256,432
DATED : October 26, 1993
INVENTOR(S) : Jane M. McDonald, et al.

It is certified that error appears in the above-indentified patent and that said Letters Patent is hereby corrected as shown below:

Column 7:
    In claim 1, line 15, delete the first occurrence of "and" and substitute --said--.

In claim 11, line 48, delete "steps: 'forming" and substitute --steps: forming--.

In claim 11, line 52, delete "form" and substitute --from--.

Signed and Sealed this

Twenty-second Day of November, 1994

Attest:

BRUCE LEHMAN

*Attesting Officer*      *Commissioner of Patents and Trademarks*